United States Patent
Cho et al.

(10) Patent No.: US 10,355,868 B2
(45) Date of Patent: Jul. 16, 2019

(54) METHOD OF PROVIDING SECURITY FOR CONTROLLER USING ENCRYPTION AND APPARATUS THEREFOR

(71) Applicants: HYUNDAI MOTOR COMPANY, Seoul (KR); KIA MOTORS CORPORATION, Seoul (KR); YURA CORPORATION CO., LTD., Gyeonggi-do (KR)

(72) Inventors: A Ram Cho, Suwon-si (KR); Ho Jin Jung, Seoul (KR); Hyun Soo Ahn, Seoul (KR); Young Hoon Kwon, Seoul (KR); Soo Mi Kim, Seoul (KR)

(73) Assignees: HYUNDAI MOTOR COMPANY, Seoul (KR); KIA MOTORS CORPORATION, Seoul (KR); YURA CORPORATION CO., LTD., Seongnam-si, Gyeonggi-do (KR)

( * ) Notice: Subject to any disclaimer, the term of this patent is extended or adjusted under 35 U.S.C. 154(b) by 285 days.

(21) Appl. No.: 15/371,804

(22) Filed: Dec. 7, 2016

(65) Prior Publication Data

US 2017/0338961 A1    Nov. 23, 2017

(30) Foreign Application Priority Data

May 17, 2016    (KR) .................. 10-2016-0060261

(51) Int. Cl.
*H04L 9/32* (2006.01)
*H04L 9/08* (2006.01)

(52) U.S. Cl.
CPC .......... *H04L 9/3247* (2013.01); *H04L 9/0822* (2013.01); *H04L 9/3242* (2013.01);
(Continued)

(58) Field of Classification Search
CPC ... H04L 9/3247; H04L 9/0822; H04L 9/3242; H04L 9/3268; H04L 9/0819; H04L 9/14;
(Continued)

(56) References Cited

U.S. PATENT DOCUMENTS 9,654,968 B2 *   5/2017   Peeters ................. H04L 63/061
9,948,614 B1 *   4/2018   Howard .............. H04L 63/0428
(Continued)

FOREIGN PATENT DOCUMENTS

JP       2013-026964 A     2/2013
KR       10-0559542 B1     3/2006
(Continued)

OTHER PUBLICATIONS

Office Action dated Aug. 14, 2017 issued in Korean Patent Application No. 10-2016-0060261.

*Primary Examiner* — Meng Li
*Assistant Examiner* — Alexander R Lapian
(74) *Attorney, Agent, or Firm* — Morgan Lewis & Bockius LLP

(57) ABSTRACT

The present disclosure relates to a method of managing a controller with reliability and, more particularly, to authentication and data exchange during installation/use/removal of a vehicle controller, a gateway and a tester using an encryption algorithm. A method of authenticating a controller by a gateway in a vehicle includes: transmitting a first message including a first random number to the controller when a first condition is satisfied; receiving, from the controller, a second message including the first random number to which an electronic signature has been attached through a private key of the controller; decrypting the first random number having the electronic signature attached thereto using a public key of the controller; and transmitting, to the controller, a symmetric key encrypted using the public (Continued)

key of the controller when the decryption has been successfully performed.

16 Claims, 13 Drawing Sheets

(52) U.S. Cl.
CPC ........ *H04L 9/3268* (2013.01); *H04L 2209/08* (2013.01); *H04L 2209/84* (2013.01)

(58) Field of Classification Search
CPC . H04L 9/3263; H04L 9/3271; H04L 2209/08; H04L 2209/84; H04L 9/0816; H04L 9/0825; H04L 67/12; G06F 21/50; G06F 21/55; G06F 21/552; G06F 21/554; G06F 21/57; G06F 21/577
See application file for complete search history.

(56) References Cited

U.S. PATENT DOCUMENTS

| | | | |
|---|---|---|---|
| 2002/0120856 A1* | 8/2002 | Schmidt | G05B 19/0426 713/193 |
| 2008/0065883 A1* | 3/2008 | Zeng | H04L 63/0869 713/168 |
| 2008/0162354 A1* | 7/2008 | Alve | G06F 21/10 705/51 |
| 2014/0025950 A1* | 1/2014 | Peeters | H04L 63/061 713/168 |
| 2015/0172298 A1* | 6/2015 | Otsuka | H04L 63/123 726/30 |
| 2016/0173505 A1* | 6/2016 | Ichihara | H04L 63/123 713/170 |
| 2016/0283896 A1* | 9/2016 | Dziurda | G06Q 10/087 |
| 2016/0344705 A1* | 11/2016 | Stumpf | H04L 67/12 |
| 2017/0060559 A1* | 3/2017 | Ye | G06F 8/65 |
| 2017/0111177 A1* | 4/2017 | Oguma | G06F 21/575 |
| 2017/0324558 A1* | 11/2017 | Takemori | H04L 9/0822 |
| 2019/0007215 A1* | 1/2019 | Hakuta | G06F 21/44 |
| 2019/0028448 A1* | 1/2019 | Farrell | H04L 9/3271 |

FOREIGN PATENT DOCUMENTS

| | | |
|---|---|---|
| KR | 10-2012-0140224 A | 12/2012 |
| KR | 10-1269086 B1 | 5/2013 |
| KR | 10-2013-0083619 A | 7/2013 |
| KR | 10-1378784 B1 | 3/2014 |
| KR | 10-1481403 B1 | 1/2015 |
| KR | 10-2015-0030122 A | 3/2015 |
| KR | 10-2015-0109202 A | 10/2015 |

* cited by examiner

METHOD OF PROVIDING SECURITY FOR CONTROLLER USING ENCRYPTION AND APPARATUS THEREFOR

CROSS-REFERENCE TO RELATED APPLICATION

This application claims the benefit of Korean Patent Application No. 10-2016-0060261, filed on May 17, 2016, which is hereby incorporated by reference as if fully set forth herein.

TECHNICAL FIELD

The present disclosure relates to a method of managing a controller with reliability and, more particularly, to authentication and data exchange during installation/use/removal of a vehicle controller, a gateway and a tester using an encryption algorithm.

BACKGROUND

To prevent theft of a controller mounted in a vehicle or use of a non-genuine controller in a vehicle, an anti-theft system has been used. However, anti-theft systems may be destroyed or disassembled and require additional cost. Due to such problems, a management method through a management center based on controller identifiers has been proposed.

The identifier-based management method allocates an identifier per controller and stores identifiers in the management center as management data such that an identification device in a vehicle, such as a gateway, can inquire as to identifiers corresponding to controllers registered as genuine products in the management center. Accordingly, when a vehicle internal system is started, the identification device checks whether the identifier of a target controller corresponds to stored identifiers and acknowledges communication with respect to the corresponding identifier. However, this method does not employ an encryption algorithm, and thus identifiers may be exposed to malicious hackers during communication for identifier transmission. In this case, genuine product certification of a controller corresponding to an exposed identifier may be used for other non-genuine controllers.

To solve such problem, use of genuine controllers may be compelled using a public key encryption algorithm. However, it is difficult to provide a real-time security function in vehicles with current computational capability of vehicle controllers.

SUMMARY

An object of the present disclosure devised to solve the problem is to provide a method of managing a controller of a vehicle with reliability and an apparatus therefor.

Another object of the present disclosure is to provide an encryption based safer authentication and communication method for controller management.

Yet another object of the present disclosure is to provide an enhanced security procedure during installation, driving and removal of a vehicle controller.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure to accomplish the object, a method of authenticating a controller by a gateway in a vehicle includes: transmitting a first message including a first random number to the controller when a first condition is satisfied; receiving, from the controller, a second message including the first random number to which an electronic signature has been attached through a private key of the controller; decrypting the first random number having the electronic signature attached thereto using a public key of the controller; and transmitting, to the controller, a symmetric key encrypted using the public key of the controller when the decryption has been successfully performed.

In another aspect of the present disclosure, a method of authenticating a controller of a vehicle includes: receiving a first message including a first random number from a gateway when a first condition is satisfied; attaching an electronic signature to the first random number using a private key of the controller and delivering the first random number having the electronic signature attached thereto to the gateway through a second message; receiving an encrypted symmetric key from the gateway when the gateway has successfully verified the electronic signature using the second message; and decrypting the encrypted symmetric key to acquire the symmetric key.

In another aspect of the present disclosure, a method of authenticating a controller of a vehicle includes: acquiring a first certificate from a first device when the controller is produced; inserting a public key of the controller into the first certificate and transmitting the first certificate to the first device; receiving a first random number from the first device; and encrypting the first random number and transmitting the encrypted first random number to the first device such that the first device decrypts the first random number using the public key of the controller.

According to at least one embodiment of the present disclosure, a vehicle controller can be managed more safely.

Particularly, a controller that is not certificated as a genuine product cannot perform communication when the vehicle in which the controller is mounted is driven, and thus it is possible to compel use of genuine controllers to improve product reliability.

In addition, since a certificate-based authentication process needs to be performed when a controller is mounted in/unmounted from a vehicle, it is possible to restrain use of non-genuine controllers.

Furthermore, controllers communicate by sharing a symmetric key instead of a public key when the corresponding vehicle is driven and the symmetric key is periodically replaced, thereby improving data security during vehicle communication.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The present invention will now be described in more detail through preferred embodiments with reference to the accompanying drawings. The terms "module" and "unit or part" used to signify components are used herein to aid in understanding of the components and thus they should not be considered as having specific meanings or roles.

Embodiments of the present disclosure are applicable to a gateway, a controller and a tester. A system architecture including the gateway, the controller and the tester will now be described with reference to FIG. 1.

Figure 1:
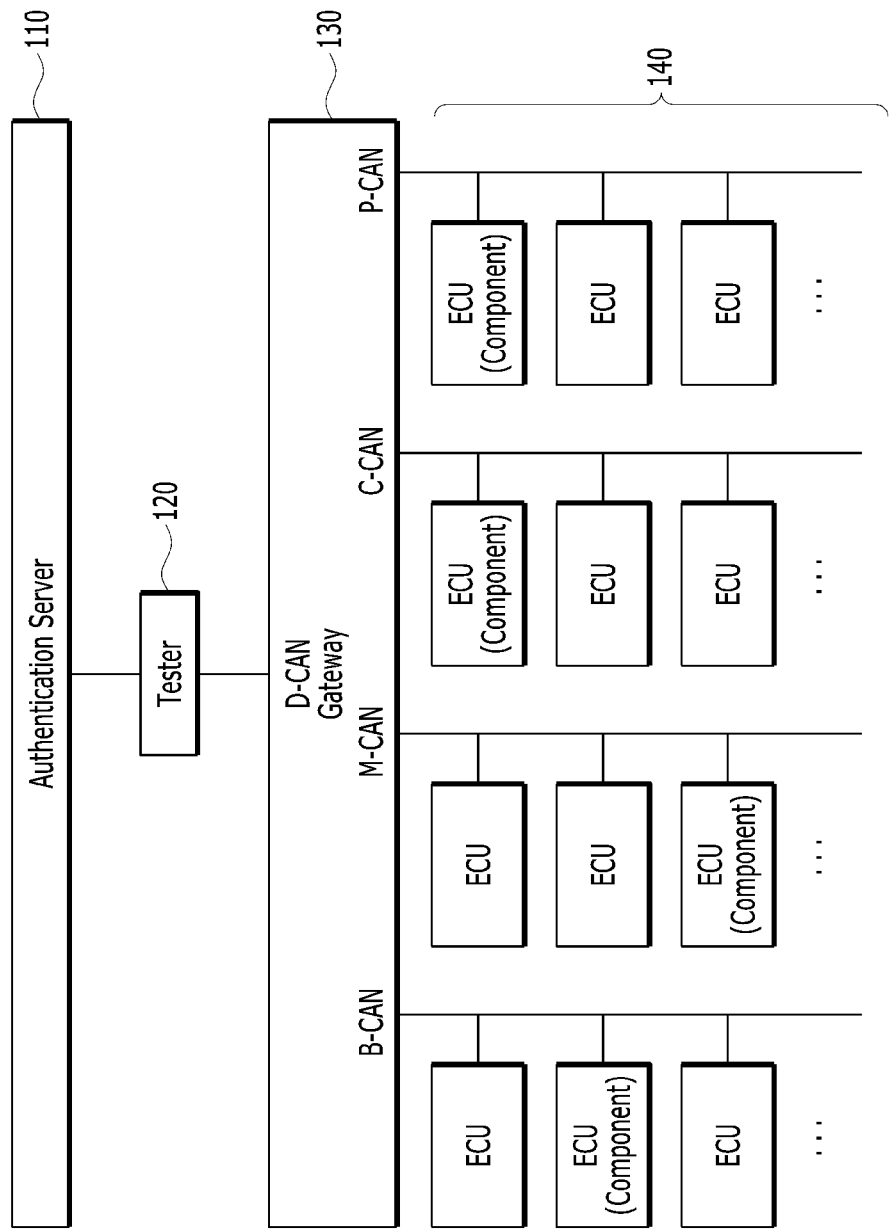
FIG. 1 is a block diagram of a system applicable to embodiments of the present disclosure.

FIG. 1 is a block diagram of an exemplary system architecture to which embodiments of the present disclosure are applicable.

Referring to FIG. 1, the system to which embodiments of the present disclosure can be applied may include an authentication server 110, a tester 120, a vehicle gateway 130 and controllers 140.

The authentication server 110 enables an identification device in a vehicle to inquire as to identifiers of products registered as genuine products in a management center. The tester 120 may serve as a data path between the vehicle gateway 130 and the authentication server 110. The gateway manages the controllers 140.

Embodiments of the present disclosure describe data exchange between the tester 120, the gateway 130 and the controller 140 and authentication thereof, and a communication environment between the authentication server 110 and the tester 120 is not described unless otherwise mentioned (that is, communication between the server and the tester is not limited).

Monitoring of genuine product management and use of non-genuine components for controllers according to controller management methods of embodiments of the present disclosure may be divided into the following five steps.

A. Controller unit production
B. Vehicle assembly
C. Monitoring during traveling of vehicle
D. Controller unit unmounting
E. Controller unit mounting Embodiments of the present disclosure commonly include a certificate verification process through which reliability between communication targets can be secured.

A description will be given of architectures of devices applied to an embodiment of the present disclosure with reference to FIGS. 2, 3 and 4.

Figure 2:
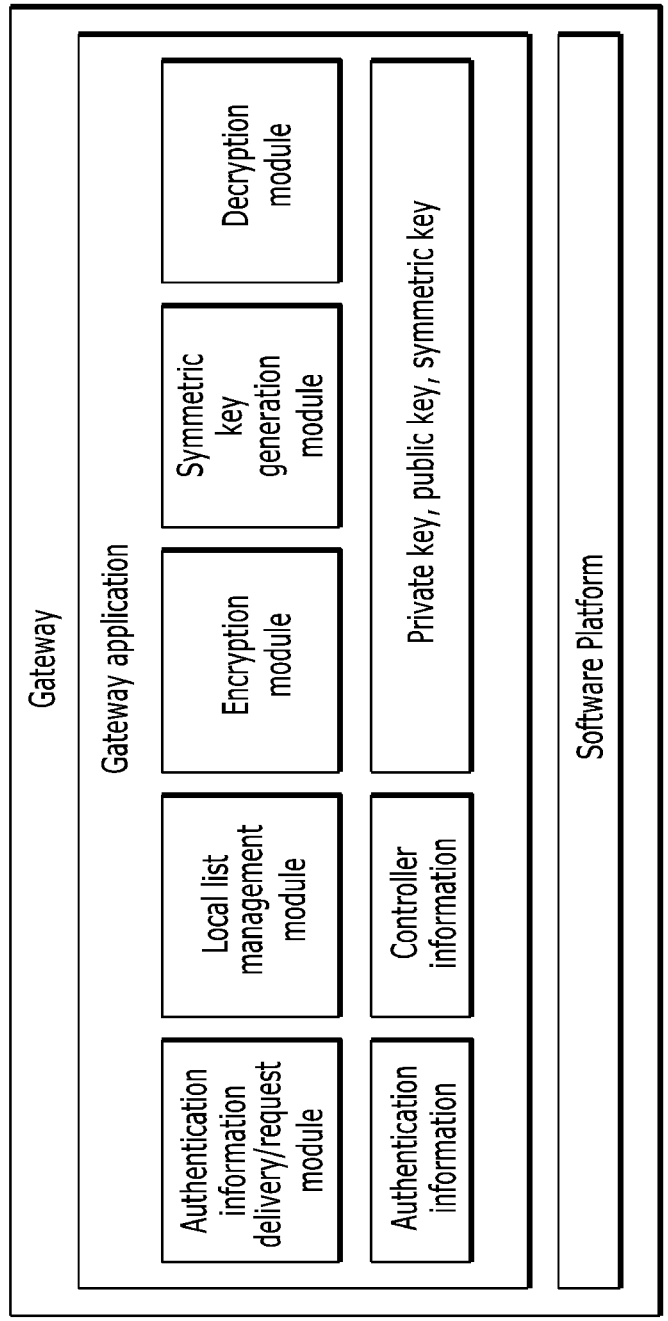
FIG. 2 illustrates an exemplary architecture of a gateway according to an embodiment of the present disclosure.

FIG. 2 illustrates an exemplary architecture of a gateway according to an embodiment of the present disclosure.

Referring to FIG. 2, an authentication information delivery/request module executes a function of the gateway to deliver a certificate thereof to a communication target or to request for a certificate of the communication target before communication.

A local list management module executes a function of providing a local list managed thereby to a tester upon reception of a local list request from the tester. Here, the local list may include certificates of controllers connected to the gateway during a vehicle assembly stage. The local list management module may update the local list in case of generation of a controller unit mounting or unmounting event after vehicle assembly.

Messages other than messages delivering certificates from the gateway to the tester or controllers require an encryption process. An encryption module performs the encryption process. While a key used for encryption is a private key of the gateway in general, a symmetric key instead of the private key of the gateway is used when the corresponding vehicle is delivered to a user and normally driven in the present embodiment.

A symmetric key generation module periodically regenerates the symmetric key after the vehicle is delivered to the user in order to enhance security.

A decryption process is required to decrypt a message encrypted in a controller and delivered. The decryption process is performed by a decryption module. While a key used for decryption is a public key of the controller in most cases, a symmetric key instead of the public key is used when the vehicle is delivered to the user and normally driven in the present embodiment.

In addition to the aforementioned modules, authentication information including the gateway certificate, controller information including controller certificates and keys (private key, public key and symmetric key) used for security procedures may compose a gateway application.

Figure 3A:
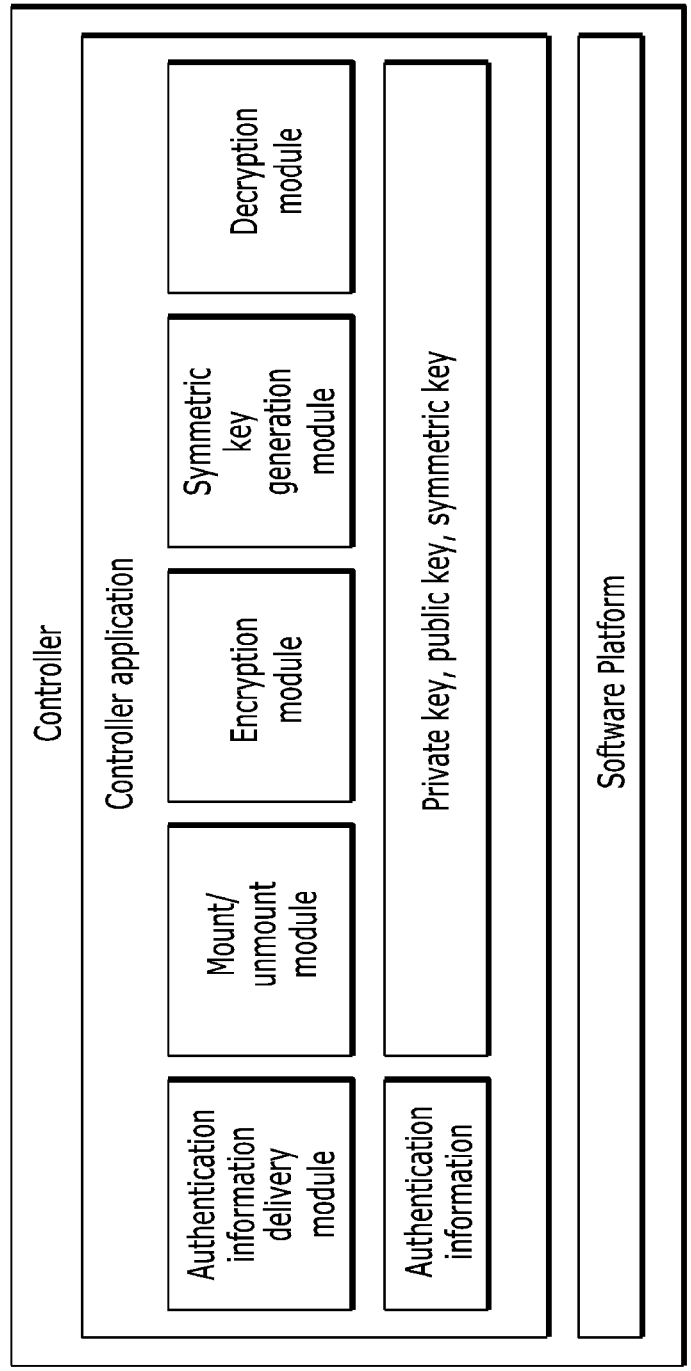
FIGS. 3A and 3B illustrate an exemplary architecture of a controller according to an embodiment of the present disclosure.
Figure 3B:
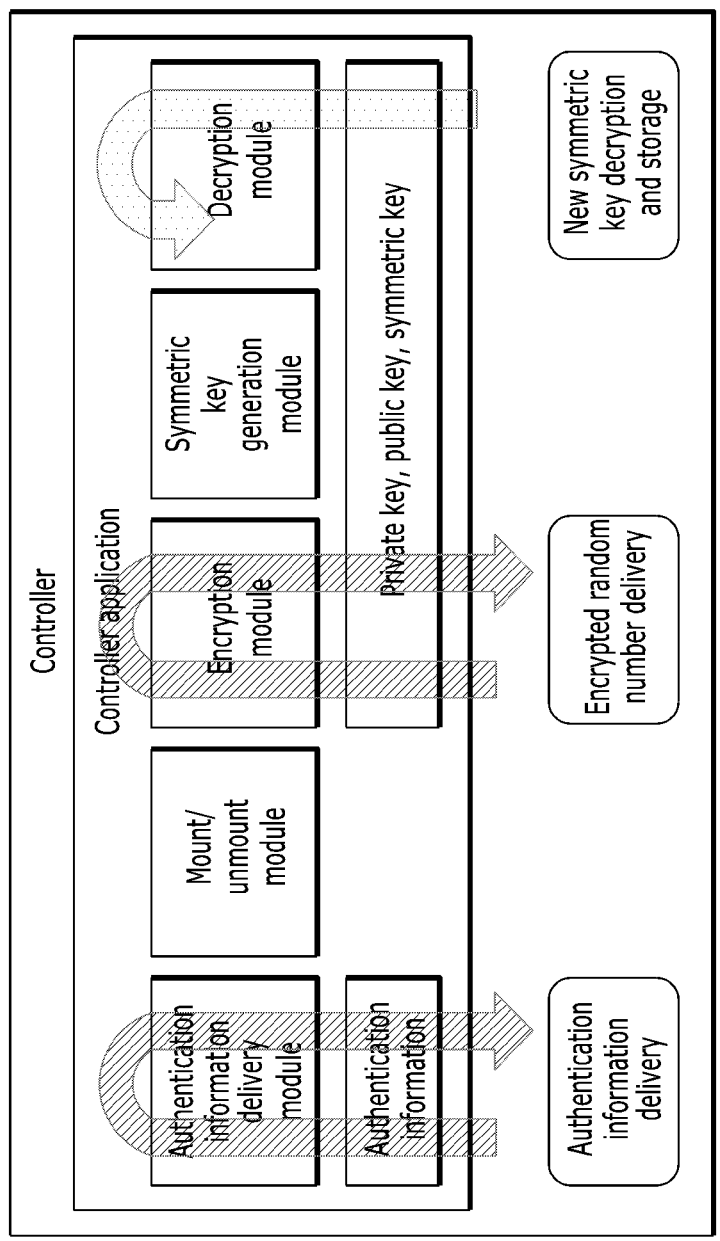

FIGS. 3A and 3B illustrate an exemplary architecture of a controller according to an embodiment of the present disclosure.

Referring to FIG. 3A, an authentication information delivery/request module executes a function of a controller to deliver a certificate thereof to a communication target before communication.

A mount/unmount module receives a mount/unmount request message from a tester and delivers a mount/unmount response message to the tester. Upon delivery of a mount/unmount confirmation message from the tester to the controller after a mount/unmount procedure with respect to the gateway, the controller stores a mount/unmount mode and a gateway certificate hash.

Messages other than messages delivering certificates from the controller to the tester or the gateway require an encryption process. An encryption module performs the encryption process. While a key used for encryption is a private key of the controller in general, a symmetric key instead of the private key of the controller is used when the corresponding vehicle is delivered to a user and normally driven in the present embodiment.

A symmetric key management module periodically stores the symmetric key generated in the gateway after the vehicle is delivered to the user. The symmetric key is used as a key for encryption when the vehicle travels.

A decryption process is required to decrypt a message encrypted and delivered. The decryption process is performed by a decryption module. While a key used for decryption is a public key of the gateway in general, a symmetric key instead of the public key is used when the vehicle is delivered to the user and normally driven in the present embodiment.

In addition to the aforementioned modules, authentication information including the gateway certificate and keys (private key, public key and symmetric key) used for security procedures may compose a controller application.

FIG. 3B illustrates a relationship of modules participating in a process of delivering authentication information to the gateway, a process of delivering an encrypted random number and a process of receiving, decrypting and storing a symmetric key newly generated in the gateway, in the controller. FIG. 3B will be described in more detail later.

Figure 4:
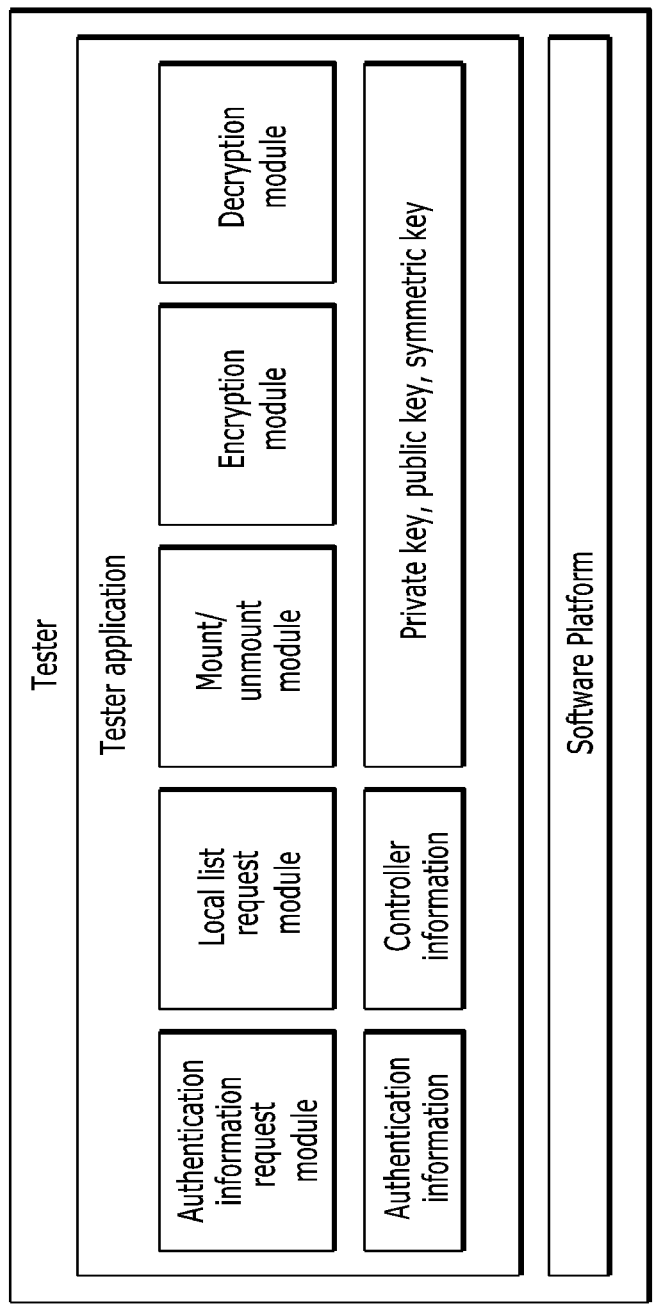
FIG. 4 illustrates an exemplary architecture of a tester according to an embodiment of the present disclosure.

FIG. 4 illustrates an exemplary architecture of a tester according to an embodiment of the present disclosure.

Referring to FIG. 4, an authentication information request module executes a function of requesting a certificate of a communication target before communication.

A local list request module executes a function of receiving a local list of a controller connected to the vehicle, which is stored in the gateway. Accordingly, the tester can verify the local list through the authentication server and notify the gateway of the verification result.

An encryption module performs an encryption process necessary to send an unmount request message from the tester to the controller. Here, a private key of the tester can be used for encryption.

A mount/unmount module delivers a mount/unmount request message to the corresponding controller in order to mount/unmount the controller in/from the vehicle and receives a mount/unmount response message from the controller in response to the mount/unmount request message. Accordingly, the tester can deliver a mount/unmount confirmation message to the controller after completion of an unmount procedure with the gateway.

A decryption process is required to decrypt an encrypted message delivered to the tester. A decryption module performs the decryption process. The public key of the gateway or the controller is used for decryption according to situation.

In addition to the aforementioned modules, authentication information including a gateway identifier and public key information, controller information including the local list and keys (private key and public key) used for security procedures may compose a tester application.

A detailed description will be given of operations of the aforementioned devices, performed in the aforementioned five processes A to E including a production process and an assembly process according to the present embodiment, on the basis of the aforementioned architectures of the devices.

Figure 5:
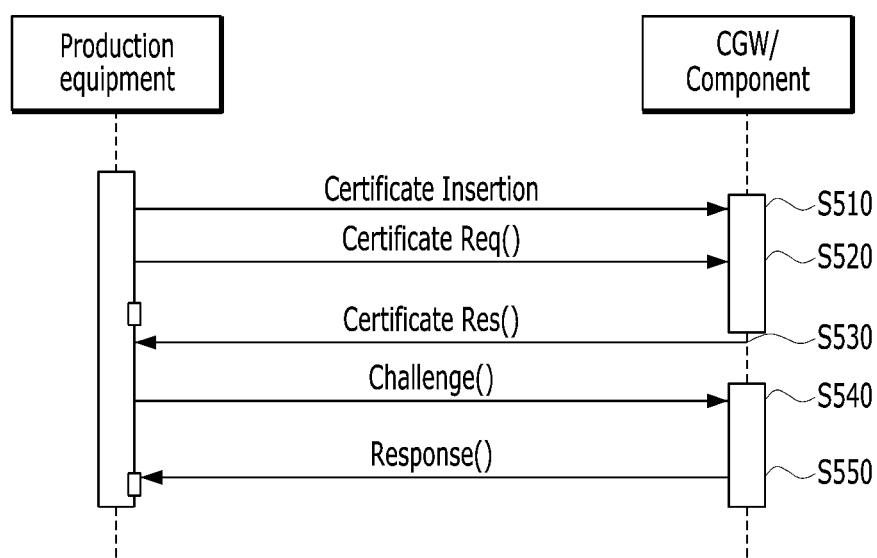
FIG. 5 illustrates an exemplary operation process between production equipment and vehicle equipment during a unit production procedure according to an embodiment of the present disclosure.

FIG. 5 illustrates an exemplary operation process between production equipment and vehicle equipment during a unit manufacturing process according to an embodiment of the present disclosure.

Referring to FIG. 5, a certificate may be inserted into a produced gateway/controller unit (510).

Upon certificate insertion, the production equipment (tester) sends a Certificate Req message to the controller (S520). Here, the production equipment requests the certificate in order to obtain an ID for identifying a communication target and information necessary to decrypt an encrypted message that will be delivered thereto.

The controller delivers a Certificate Res message including the certificate thereof to the production equipment (tester) (S530).

Upon reception of the certificate of the controller, the production equipment sends a Challenge message to the controller in order to check whether the received certificate has been correctly delivered (S540). The Challenge message may include a random number generated by the production equipment (tester).

Upon reception of the Challenge message, the controller encrypts the random number included in the Challenge message and sends the encryption result through a Response message (S550). The production equipment (tester) decrypts the Response message using a public key of the controller, which is included in the received certificate. Upon successful decryption, the production equipment can determine the certificate of the controller to be correct.

Figure 6:
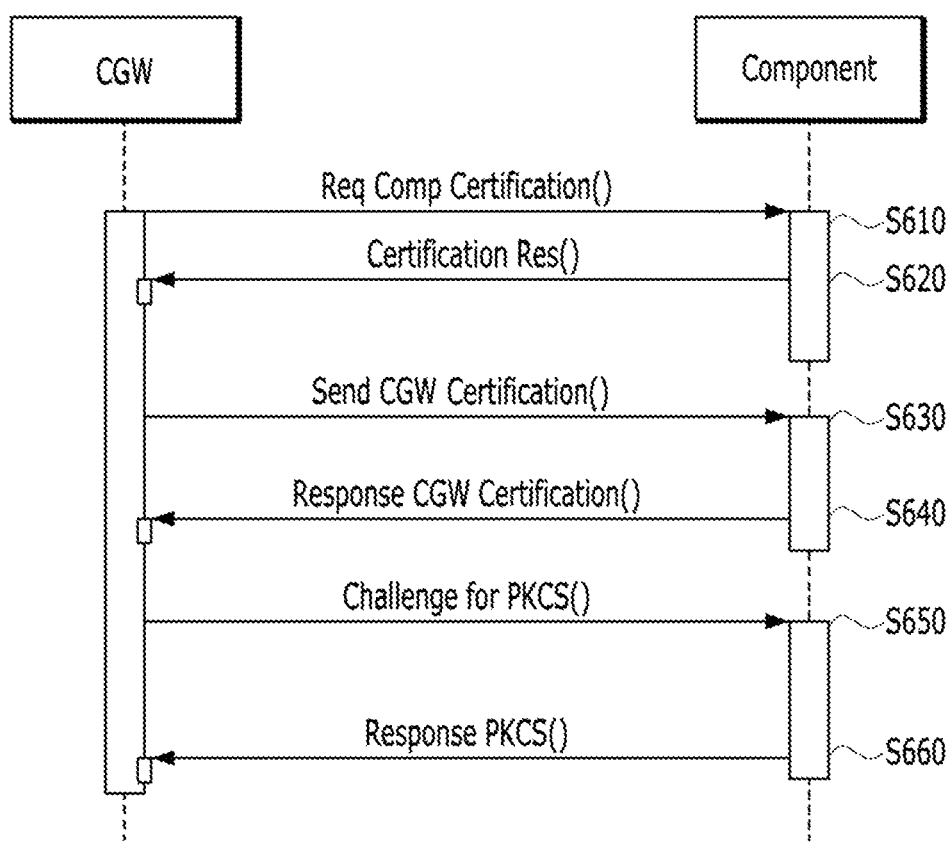
FIG. 6 illustrates an exemplary operation process between a controller and a gateway when the controller is assembled into a vehicle according to an embodiment of the present disclosure.

FIG. 6 illustrates an exemplary operation process between a controller and a gateway in a process of assembling the controller into a vehicle according to an embodiment of the present disclosure.

Referring to FIG. 6, the gateway CGW sends a Req Com Certification message to the controller (S610). This step is performed in the initial vehicle assembly stage and the Req Comp Certification message may be a message indicating start of first communication between the gateway and the controller upon supply of power. The gateway can recognize controllers under the control thereof through this step.

The controller delivers the certificate thereof to the gateway through a Response certification message (S620).

The gateway sends the certificate thereof to the controller through a CGW Certification message (S630). The certificate of the gateway is necessary for the controller to decrypt a message encrypted by the gateway and sent to the controller. Through this step, the controller can recognize the gateway to which the controller belongs.

Upon completion of certificate exchange according to response of the controller, the controller notifies the gateway of a gateway certificate verification result through a Response CGW certification message (S640).

The gateway sends a Challenge for PKCS message to the controller in order to check whether the certificate received from the controller is correct (S650). The controller encrypts data using a private key thereof and sends the encrypted data through a Response PKCS message (S660). Upon reception of the Response PKCS message, the gateway decrypts the message using a public key of the controller, which is included in the received certificate. Upon successful decryption of the gateway, the delivered certificate can be determined to be correctly received.

Figure 7:
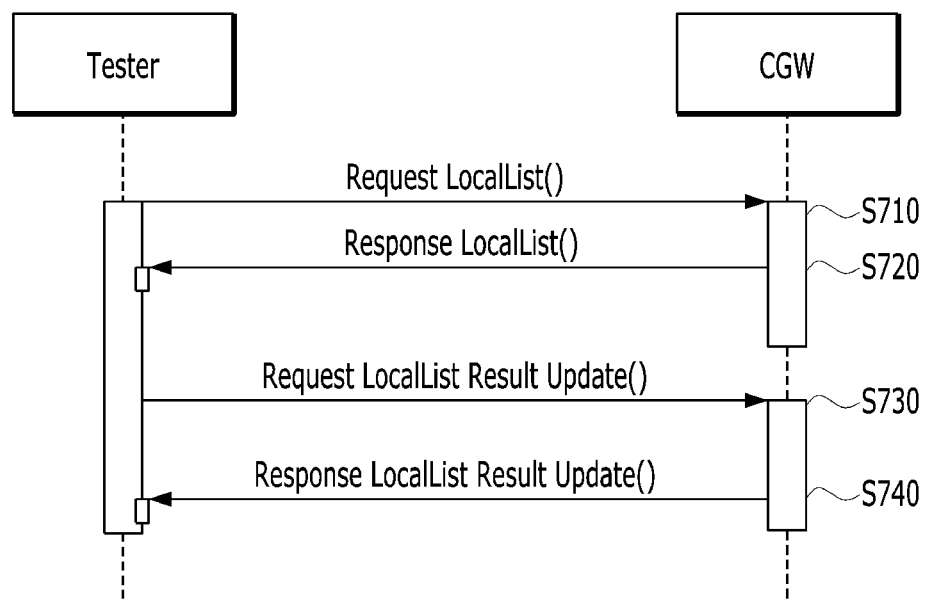
FIG. 7 illustrates an exemplary operation process between a tester and a gateway in a vehicle assembly procedure according to an embodiment of the present disclosure.

FIG. 7 illustrates an exemplary operation process between a tester and a gateway in a vehicle assembly procedure according to an embodiment of the present disclosure.

The process of FIG. 7 can be performed upon completion of the process of FIG. 6. The tester sends a request local list message to the gateway in order to recognize a gateway and controllers connected to the gateway (S710).

The gateway sends local list information thereof through a Response local list message to the tester in response to the Request local list message (S720). The local list information may include the number of controllers connected to the gateway, a random number, controller IDs, hash information of controller certificates and signature data. More specifically, the local list information may include vehicle information, the number of authenticated controllers, controller information and an electronic signature of the gateway for the local list. The controller information may include at least one of a controller ID or controller name, a controller unique number (serial number, VIN number or the like) and a controller certificate hash value.

Upon acquisition of the local list information, the tester may compare the information of the gateway with information stored in an authentication server linked through the Internet, update the information and, when the information has an error, notify the gateway of the error through a Request LocalList Result Update message (S730).

The gateway may notify the tester that the update message has been correctly received through a Response LocalList Result Update message (S740).

Figure 8:
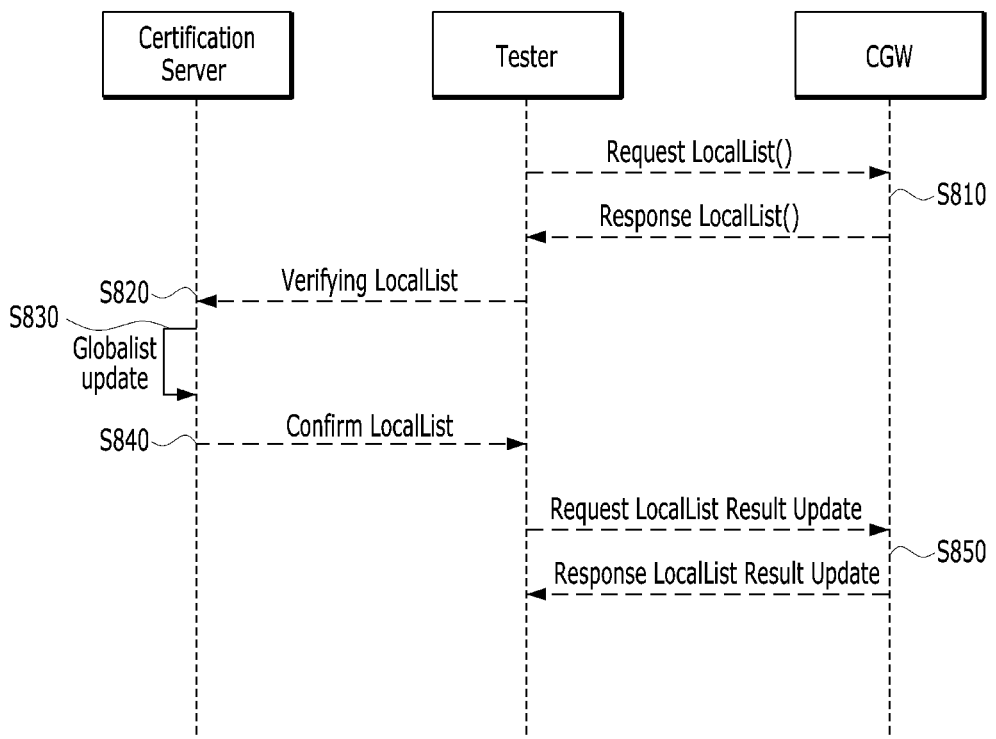
FIG. 8 illustrates an exemplary local list verification procedure between a tester and an authentication server according to an embodiment of the present disclosure.

A local list information verification process of the tester, that is, a process performed between S720 and S730, will now be described with reference to FIG. 8. FIG. 8 illustrates an exemplary local list verification process between the tester and the authentication server (certification server) according to an embodiment of the present disclosure.

Description of message transmission steps (S810 and S850) in FIG. 8, which correspond to those of FIG. 7, is omitted.

Upon acquisition of the local list information, the tester requests local list verification of the authentication server linked thereto through the Internet using a Verifying LocalList message (S820).

The authentication server compares controller information (i.e. controller ID, unique number and certificate hash) of the local list with information stored therein to verify the local list and updates a global list (S830). Here, the global list is a kind of a set of local lists and the authentication server may recognize all vehicle models, presence or absence of a genuine tester per vehicle model and the like through the global list.

When the local list verification result includes changes (e.g. a specific controller is not genuine), the authentication server may notify the tester of the changes through a Confirm LocalList message (S840).

Figure 9:
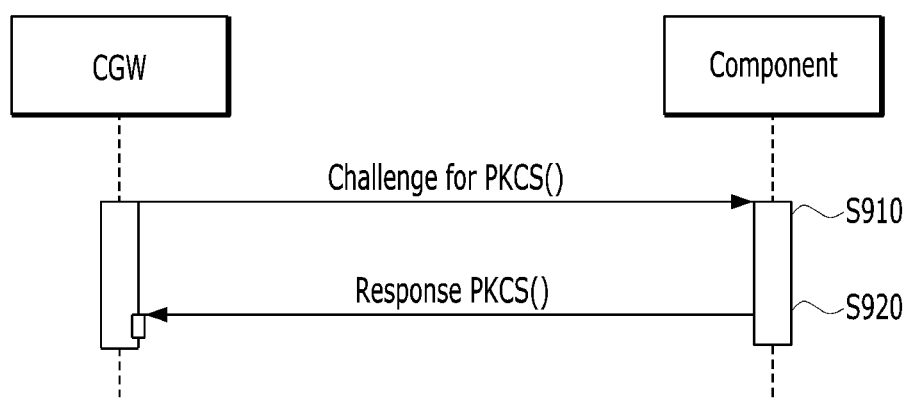
FIG. 9 illustrates an exemplary process of determining whether to distribute a symmetric key when a vehicle travels according to an embodiment of the present disclosure.
Figure 10:
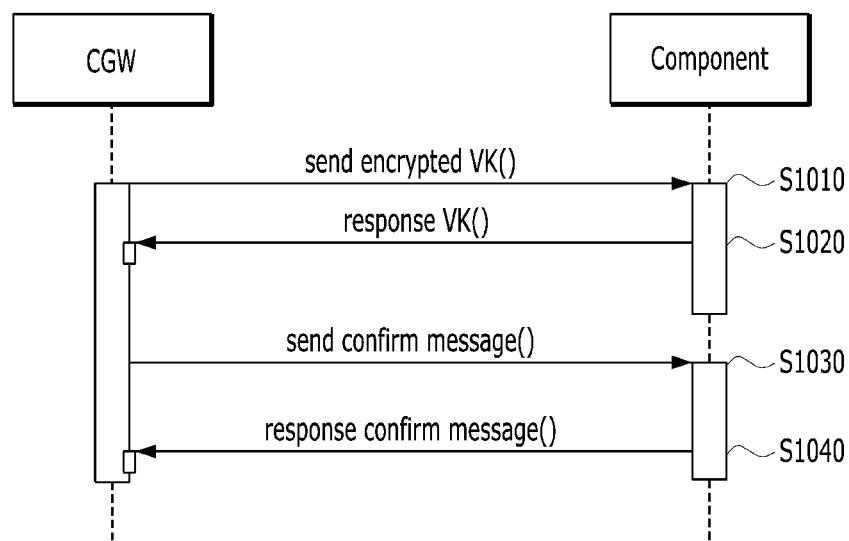
FIG. 10 illustrates an exemplary process of distributing a symmetric key when a vehicle travels according to an embodiment of the present disclosure.
Figure 11:
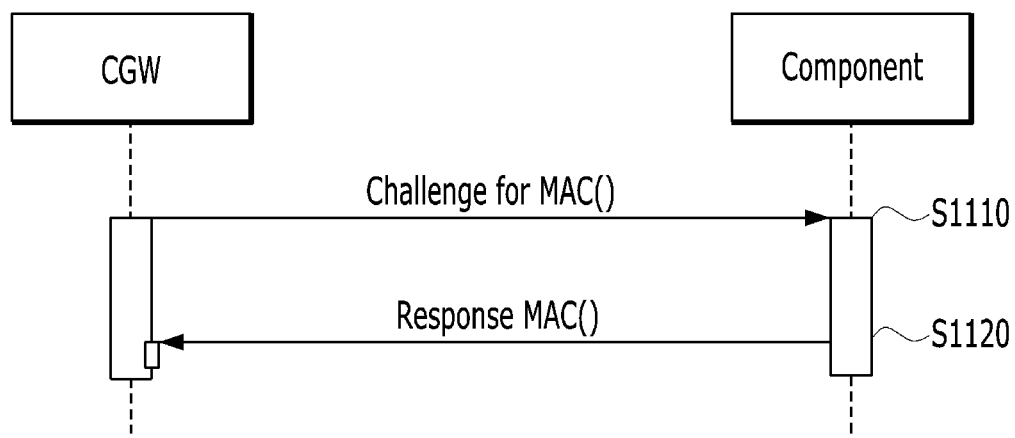
FIG. 11 illustrates an exemplary periodic controller authentication process using a symmetric key when a vehicle travels according to an embodiment of the present disclosure.

A description will be given of an operation processes between the gateway and a controller when the corresponding vehicle travels with reference to FIGS. 9, 10 and 11. FIGS. 9, 10 and 11 may be processes after successful completion of the processes of FIGS. 5, 6 and 7.

FIG. 9 illustrates an exemplary process of determining whether to distribute a symmetric key when the vehicle travels according to an embodiment of the present disclosure.

The gateway generates a random number in order to verify whether the controller is genuine and sends the random number to the controller through a Challenge for PKCS message (S910). This procedure can be performed when a symmetric key used for vehicle driving is initially distributed (in case of starting the vehicle) or a predetermined symmetric key use period expires.

Upon reception of the Challenge for PKCS message, the controller attaches an electronic signature to the random number included in the message using a private key thereof and sends the signature value to the gateway through a Response PKCS message (S920).

The gateway verifies the signature and distributes a symmetric key to be used when the vehicle travels upon successful verification. The symmetric key distribution process will now be described with reference to FIG. 10.

FIG. 10 illustrates an exemplary process of distributing a symmetric key when the vehicle travels according to an embodiment of the present disclosure. The process of FIG. 10 is preferably performed upon successful verification of the signature of the controller after the process of FIG. 9 has been normally performed, that is, after the gateway has initially distributed the symmetric key to the controller or after periodic controller authentication using the symmetric key after symmetric key distribution has failed.

For symmetric key distribution, the gateway encrypts the symmetric key using a public key of the controller and sends an encrypted VK message to the controller (S1010).

The controller may receive the encrypted symmetric key through the encrypted VK message and decrypt the encrypted symmetric key using the private key thereof to acquire the symmetric key. Thereafter, the controller sends a response VK message to the gateway for symmetric key reception confirmation (S1020).

Upon reception of the response VK message, the gateway sends a confirmation message to the controller in order to approve use of the symmetric key (S1030).

The controller may send a response confirmation message to the gateway in response to the confirmation message (S1040).

The symmetric key can be effectively used for message exchange between the controller and the gateway.

The authentication method through a signature, described with reference to FIG. 9, has a problem when performed whenever a controller is authenticated since the quantity of calculations and the quantity of data exchange become a burden on normal vehicle controllers. Accordingly, the present embodiment proposes a process through which the gateway authenticates a controller using a periodic message authentication code (MAC) comparison method using a relatively simple random number after completion of symmetric key exchange (while the symmetric key is valid). This is described with reference to FIG. 11.

FIG. 11 illustrates an exemplary periodic controller authentication process using a symmetric key during vehicle driving according to an embodiment of the present disclosure.

Referring to FIG. 11, when symmetric key validity is present between the gateway and the controller, the gateway generates a random number in order to authenticate the controller and sends the random number to the controller through a Challenge for MAC message (S1110).

The controller generates a MAC of the received random number using the symmetric key and sends the MAC to the gateway through a Response MAC message (S1120).

Upon reception of the Response MAC message, the gateway may generate a MAC in the same manner as the controller and compare the generated MAC with the MAC received from the controller to authenticate the controller.

The process of FIG. 11 is more efficient than the process of FIG. 9 which is difficult to periodically perform since the process of FIG. 11 can considerably reduce the quantity of calculations and data exchange, compared to the security procedure through a certificate, shown in FIG. 9.

The processes of FIGS. 6 to 11 will now be described in terms of controller shown in FIG. 3B. As described above with reference to FIG. 6, the gateway sends a request for a controller certificate to a controller in order to verify whether the controller is genuine, when the corresponding vehicle is assembled or initially driven. To this end, the authentication information delivery module delivers authentication information to the gateway.

The gateway sends a random number to the controller, as described above with reference to FIG. 9. The encryption module of the controller attaches an electronic signature to the random number and sends the random number to the gateway such that the gateway can verify whether the controller is genuine through the electronic signature.

As described above with reference to FIG. 10, the gateway generates and encrypts a symmetric key and delivers the encrypted symmetric key to the controller in order to secure availability of encrypted communication. The decryption module decrypts the encrypted symmetric key using a private key thereof to obtain the symmetric key. Since the symmetric key is encrypted with a public key of a controller, only a genuine controller can decrypt the symmetric key.

In addition, it is possible to consider enhancement of security by inputting personal information of a user or a mechanic in order to execute a CID function.

A description will be given of a controller removal (unmounting) procedure and a controller setting (mounting) procedure according to an embodiment of the present disclosure with reference to FIGS. 12, 13 and 14.

Figure 12:
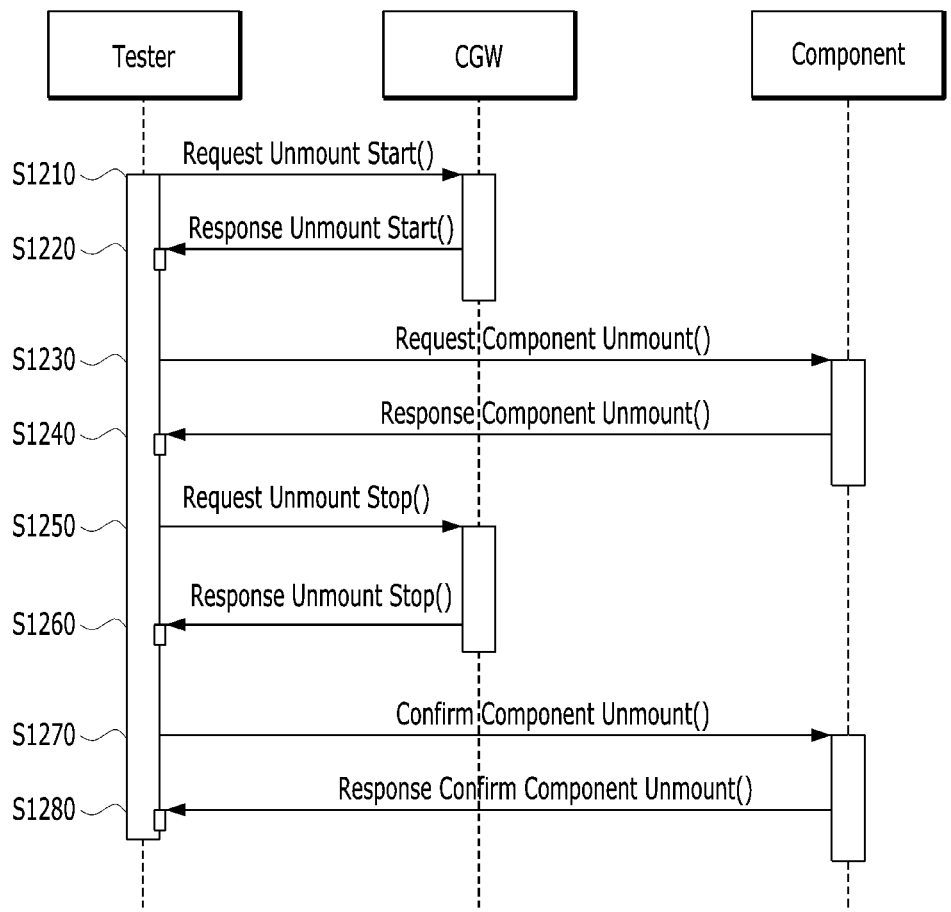
FIG. 12 illustrates an exemplary process of unmounting a controller unit from a vehicle according to an embodiment of the present disclosure.

FIG. 12 illustrates an exemplary process of unmounting a controller unit from a vehicle according to an embodiment of the present disclosure.

Referring to FIG. 12, when a controller installed in the vehicle needs to be removed from the vehicle, the tester notifies the gateway of start of controller unmounting through a Request Unmounting Start message (S1210).

The gateway prepares modification of the local list while sending a Response Unmounting Start message to the tester in response to the Request Unmounting Start message (S1220).

The tester may notify the controller to be unmounted that the controller will be unmounted through a Request Component Unmount message (S1230). Here, the tester can notify the controller of an unmounting mode. The unmounting mode may be divided into an offline mode and an online mode. The offline mode may refer to a state in which the tester is not currently connected to a server and the online mode may refer to a state in which the tester is connected to the server.

The controller sends a Response Component Unmount message to the tester in response to the Request Component Unmount message and prepares to unmount (S1240).

The tester notifies the gateway that the controller has been notified of unmounting through a Request Unmount Stop message and instructs the gateway to modify the local list (S1250).

The gateway modifies the local list and notifies the tester of completion of local list modification through a Response Unmount Stop message (S1260).

Upon completion of local list modification of the gateway, the tester informs the controller of confirmation of unmounting through a Confirm Component Unmount message (S1270).

The controller may notify the tester of successful reception of the Confirm Component Unmount message through a Response Confirm Component Unmount message (S1280).

The tester may check an unmount record of the controller.

Figure 13:
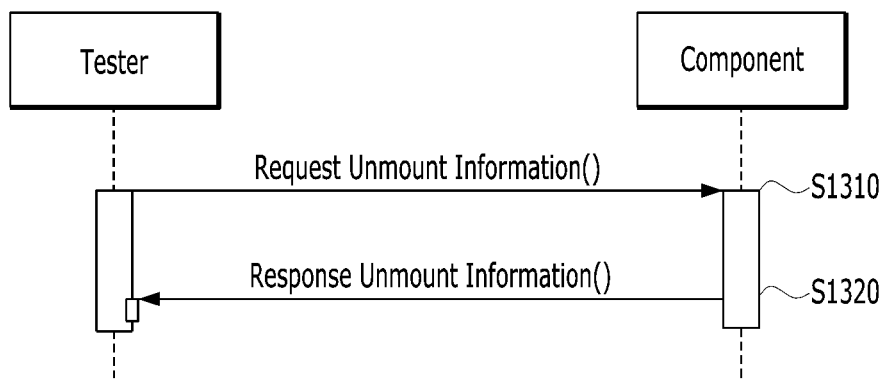
FIG. 13 illustrates an exemplary process of checking an unmount record of a controller in a vehicle according to an embodiment of the present disclosure.

FIG. 13 illustrates an exemplary process of checking an unmount record of a controller in a vehicle according to an embodiment of the present disclosure.

Referring to FIG. 13, the tester may send a request for a recent unmount record of the controller to the controller through a Request Unmount Information message (S1310).

The controller may send unmount mode (online/offline mode unmount) information and a controller/gateway certificate hash to the tester through a Response Unmount Information message in response to the request of the tester (S1320).

Figure 14:
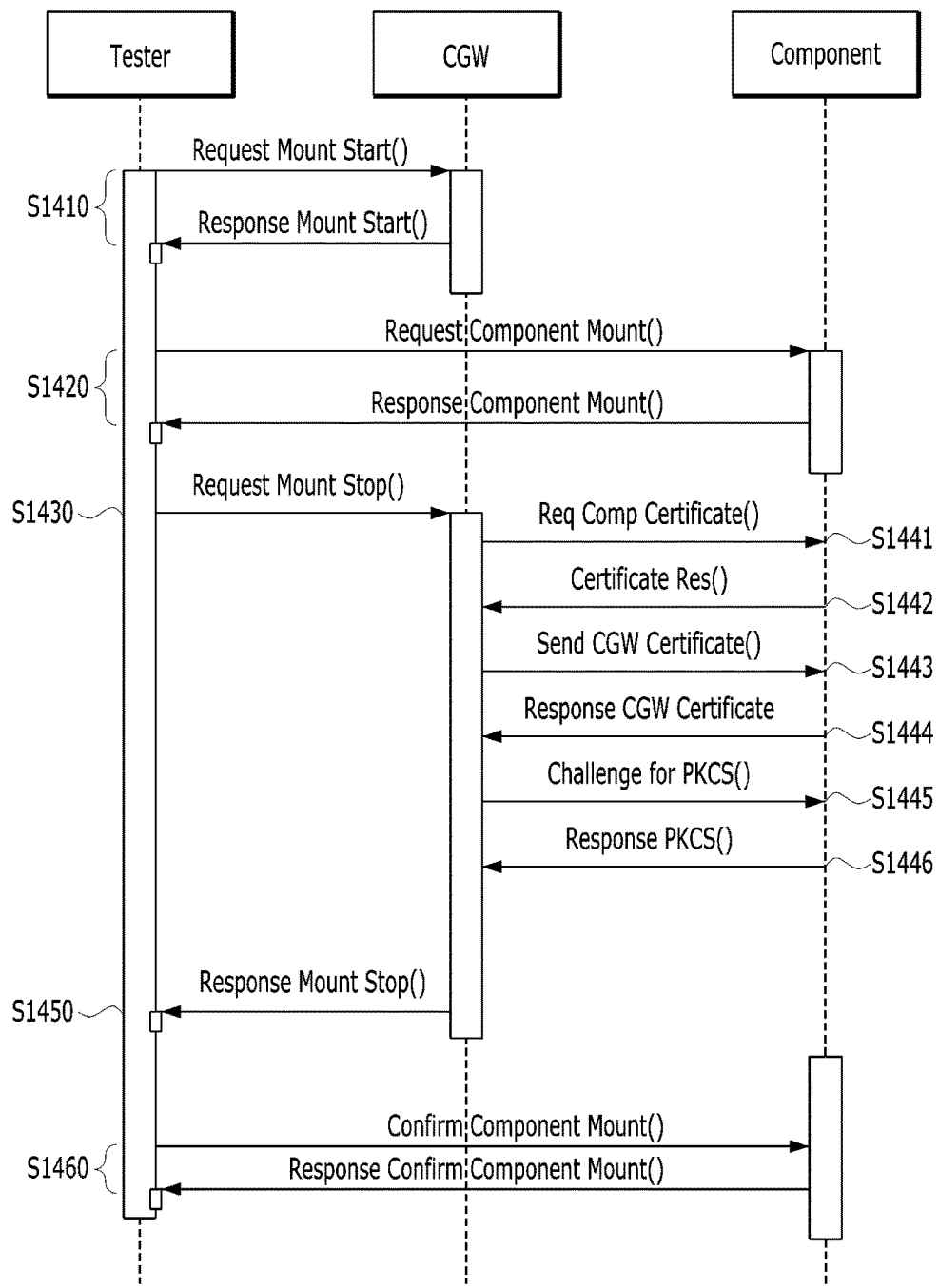
FIG. 14 illustrates an exemplary process of mounting a controller in a vehicle according to an embodiment of the present disclosure.

FIG. 14 illustrates an exemplary process of mounting a controller in a vehicle according to an embodiment of the present disclosure. The process illustrated in FIG. 14 may be performed as a process of adding a local list after addition of a controller to the vehicle.

When a new controller needs to be mounted, the tester may notify the gateway of start of controller mounting through a Request Mount Start message. The gateway sends a Response Mount Start message to the tester in response to the Request Mount Start message and prepares to modify the local list (S1410).

The tester may notify the controller that the controller will be mounted in the vehicle through a Request Component Mount message, and the controller may notify the tester that the controller is ready to be mounted through a Response Component Mount message (S1420).

The tester may instruct the gateway to modify the local list while informing the gateway that the controller has been notified that the controller will be mounted by sending a Request Mount Stop message to the gateway (S1430).

Accordingly, the gateway may perform certificate exchange and verification processes, similarly to the process of initially assembling a controller in a vehicle (S1441 to S1446). Steps S1441 to S1446 are similar to steps S610 to S660 of FIG. 6 and thus description thereof is omitted for brevity.

Upon completion of certificate exchange and verification, the gateway may finish local list modification and notify the tester of completion of local list modification by sending a Response Mount Stop message to the tester (S1450).

Accordingly, the tester may notify the controller of confirmation of mounting through a Confirm Component Mount message, and the controller may send a Response Confirm Component mount message to the tester in response to the Confirm Component Mount message (S1460).

Local list verification and global list management may be performed according to the process described above with reference to FIG. 8.

A description will be given of a controller structure applicable to embodiments of the present disclosure with reference to FIG. 15.

Figure 15:
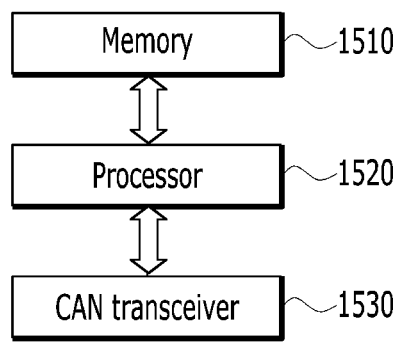
FIG. 15 illustrates an exemplary controller structure according to an embodiment of the present disclosure.

FIG. 15 illustrates an exemplary controller structure according to an embodiment of the present disclosure.

Referring to FIG. 15, a controller according to the present embodiment may include a memory 1510 for storing software modules described with reference to FIGS. 3A and 3B, authentication data and keys, a processor (i.e. microcomputer) 1520 for performing control and operations according to software stored in the memory 1510, and a CAN transceiver 1530 for performing CAN communication for exchanging data with external devices. That is, data can be input from/output to external devices in the aforementioned processes through the CAN transceiver 1530 under the control of the processor 1520, and the processor 1520 can control overall operation of the controller in the aforementioned processes. For example, the processor 1520 can interpret a message received through the CAN transceiver 1530, perform an operation (encryption, decryption, signing, MAC generation, etc.) corresponding to the interpretation result, generate a message corresponding to the operation result (or message including data acquired as the operation result and suitable for transmission) and transmit the message to an external device through the CAN transceiver 1530.

The various embodiments disclosed herein, including embodiments of the authentication server, the tester, the gateway, the controller, and/or elements or modules thereof, can be implemented using one or more processors coupled to a memory (or other non-transitory machine readable recording medium) storing computer-executable instructions for causing the processor(s) to perform the functions described above. Alternatively and/or optionally, embodiments of the present disclosure may be implemented as computer-readable code and stored in a computer-readable recording medium. The computer-readable recording medium includes all kinds of storage devices storing data readable by a computer system. Examples of the computer-readable recording medium include a hard disk drive (HDD), a solid state drive (SSD), a silicon disc drive (SDD), a ROM, a RAM, a CD-ROM, a magnetic tape, a floppy disk, an optical data storage device, and a medium using a carrier wave (e.g. transmission through the Internet).

Those skilled in the art will appreciate that embodiments of the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of authenticating a controller by a gateway in a vehicle, comprising:
    transmitting a first message including a first random number to the controller when a first condition is satisfied;
    receiving, from the controller, a second message including the first random number to which an electronic signature has been attached through a private key of the controller;
    decrypting the first random number having the electronic signature attached thereto using a public key of the controller;
    transmitting, to the controller, a symmetric key encrypted using the public key of the controller when the decryption has been successfully performed;
    transmitting, to the controller, a third message including a second random number; and
    receiving a fourth message including a message authentication code (MAC) of the second random number, the MAC being generated using the symmetric key,
    wherein transmission of the third message and reception of the fourth message are periodically performed while the symmetric key is valid.

2. The method according to claim 1, further comprising:
    receiving, from the controller, a fifth message indicating successful acquisition of the symmetric key; and
    transmitting, to the controller, a sixth message indicating approval of use of the symmetric key.

3. The method according to claim 1, further comprising authenticating the controller by comparing the MAC of the second random number, received from the controller, with a MAC generated by the gateway using the symmetric key and the second random number.

4. The method according to claim 1, wherein the first condition is satisfied when the symmetric key is initially distributed or when a period of use of a previously distributed symmetric key expires.

5. A method of authenticating a controller of a vehicle, comprising:
    receiving a first message including a first random number from a gateway when a first condition is satisfied;
    attaching an electronic signature to the first random number using a private key of the controller and delivering the first random number having the electronic signature attached thereto to the gateway through a second message;
    receiving an encrypted symmetric key from the gateway when the gateway has successfully verified the electronic signature using the second message;
    decrypting the encrypted symmetric key to acquire the symmetric key;
    receiving a third message including a second random number from the gateway;
    generating a message authentication code (MAC) of the second random number using the symmetric key; and
    transmitting the generated MAC of the second random number to the gateway through a fourth message,
    wherein reception of the third message and transmission of the fourth message are periodically performed while the symmetric key is valid.

6. The method according to claim 5, further comprising:
    transmitting a fifth message indicating successful acquisition of the symmetric key to the gateway; and
    receiving a sixth message indicating approval of use of the symmetric key from the gateway.

7. The method according to claim 5, wherein the gateway compares the MAC of the second random number, received from the controller, with a MAC generated thereby using the symmetric key and the second random number to authenticate the controller.

8. The method according to claim 5, wherein the first condition is satisfied when the symmetric key is initially distributed or when a period of use of a previously distributed symmetric key expires.

9. A method of authenticating a controller of a vehicle, comprising:
    acquiring a first certificate from a first device when the controller is produced;
    inserting a public key of the controller into the first certificate and transmitting the first certificate to the first device;
    receiving a first random number from the first device;
    encrypting the first random number and transmitting the encrypted first random number to the first device such that the first device decrypts the first random number using the public key of the controller;

delivering the first certificate to a second device upon connection of the controller to the second device when the controller is mounted in the vehicle;

acquiring a second certificate of the second device from the second device; and determining, by using the second certificate, the second device as a gateway to which the controller belongs.

10. The method according to claim 9, further comprising:

receiving a second random number from the second device; and encrypting the second random number and transmitting the encrypted second random number to the second device such that the second device decrypts the encrypted second random number using the public key of the controller.

11. The method according to claim 9, wherein the first device includes a tester or controller production equipment and the second device includes the gateway.

12. The method according to claim 10, wherein the second device adds the controller to a first list and, upon reception of a request for the first list from a third device, provides the first list to the third device.

13. The method according to claim 12, wherein the third device provides the first list to a fourth device such that the fourth device updates a second list using the first list.

14. The method according to claim 13, wherein the third device receives a second list update result from the fourth device and, when the first list has an error, notifies the second device that the first list has an error.

15. The method according to claim 13, wherein the second device includes the gateway, the third device includes a tester, the fourth device includes an authentication server, the first list includes a local list, and the second list includes at least one piece of local list information.

16. The method according to claim 12, wherein the first list includes at least one of vehicle information, the number of authenticated controllers, identification information of each controller, and an electronic signature of the second device with respect to the first list.

* * * * *